(12) United States Patent
Davis et al.

(10) Patent No.: US 7,424,550 B2
(45) Date of Patent: *Sep. 9, 2008

(54) SYSTEM AND METHOD FOR SPECIFYING ACCESS TO RESOURCES IN A MOBILE CODE SYSTEM

(75) Inventors: Donald T. Davis, Somerville, MA (US); Elizabeth A. Martin, Newton, MA (US); Mathew J. Hostetter, Cambridge, MA (US); David A. Kranz, Arlington, MA (US)

(73) Assignee: Sumisho Computer Systems Corporation, Tokyo (JP)

( * ) Notice: Subject to any disclaimer, the term of this patent is extended or adjusted under 35 U.S.C. 154(b) by 594 days.

This patent is subject to a terminal disclaimer.

(21) Appl. No.: 10/269,102

(22) Filed: Oct. 10, 2002

(65) Prior Publication Data

US 2003/0126292 A1 Jul. 3, 2003

Related U.S. Application Data

(60) Provisional application No. 60/328,465, filed on Oct. 11, 2001.

(51) Int. Cl.
*G06F 15/16* (2006.01)
(52) U.S. Cl. .................. 709/245; 709/217; 709/219; 709/227; 709/229; 713/161; 713/173
(58) Field of Classification Search ............... 713/161, 713/193
See application file for complete search history.

(56) References Cited

U.S. PATENT DOCUMENTS 5,983,348 A * 11/1999 Ji ............................. 726/13

(Continued)

FOREIGN PATENT DOCUMENTS

EP 108918 A2 3/2001

(Continued)

OTHER PUBLICATIONS

Fuenfrocken, "Integrating Java-based Mobile Agents into Web Servers under Security Concerns" Proc. 31st Annual Hawaii International Conference on System Sciences, 1998 IEEE.

(Continued)

*Primary Examiner*—Bunjob Jaroenchonwanit
*Assistant Examiner*—Duyen M Doan
(74) *Attorney, Agent, or Firm*—Finnegan, Henderson, Farabow, Garrett & Dunner LLP

(57) ABSTRACT

Mobile code, such as an applet, is permitted to create a network connection with a content server on a network, without restricting the applet only to connections from the computer from which it was downloaded. This is achieved in accordance with the principles of the present invention by using network restriction software in the execution engine or runtime system under which the applet executes. When the applet attempts to create a network connection to a content server, the network restriction software checks a name file on the content server for the presence of an entry whose name corresponds to the name of the computer from which the applet was downloaded. If such an entry is present, then the network restriction software permits the network connection between the applet and the content server to be created. If not, the applet may not create a network connection with the content server.

19 Claims, 4 Drawing Sheets

U.S. PATENT DOCUMENTS

| | | | |
|---|---|---|---|
| 5,987,523 A | | 11/1999 | Hind et al. |
| 6,092,194 A * | | 7/2000 | Touboul ..................... 726/24 |
| 6,208,995 B1 * | | 3/2001 | Himmel et al. .......... 707/104.1 |
| 6,233,618 B1 * | | 5/2001 | Shannon ..................... 709/229 |
| 6,256,671 B1 * | | 7/2001 | Strentzsch et al. .......... 709/227 |
| 6,321,267 B1 * | | 11/2001 | Donaldson .................. 709/229 |
| 6,571,338 B1 * | | 5/2003 | Shaio et al. ................... 726/13 |
| 6,728,886 B1 * | | 4/2004 | Ji et al. .......................... 726/24 |
| 6,754,621 B1 * | | 6/2004 | Cunningham et al. ....... 704/219 |
| 6,993,588 B2 * | | 1/2006 | Davis et al. ................. 709/229 |
| 2002/0013910 A1 | | 1/2002 | Edery et al. |
| 2002/0138634 A1 | | 9/2002 | Davis et al. |
| 2002/0147880 A1 * | | 10/2002 | Wang Baldonado ............ 711/1 |
| 2003/0110161 A1 | | 6/2003 | Schneider |

FOREIGN PATENT DOCUMENTS

| | | |
|---|---|---|
| WO | WO 98/21666 | 5/1998 |
| WO | WO 99/30238 | 6/1999 |
| WO | WO 02/078293 A1 | 10/2002 |

OTHER PUBLICATIONS

Balfanz, D. and E.W. Felten, "A Java Filter," Technical Report, Department of Computer Science, Princeton University, p. 1-7, (Sep. 1997).

Cheswick, W.R. and Bellovin, S.M., "Firewall Gateways," in Firewalls and Internet Security: Repelling the Wily Hacker (MA: Addison- Wesley Publishing Company), pp. 51-83 (1994).

Curry, D.A., "Network Security" in UNIX® System Security, A Guide for Users and System Administrators (MA: Addison-Wesley Publishing Company, Inc.), pp. 63-85 (1992).

Dean, D., et al., "Java Security: From HotJava to Netscape and Beyond," Proceedings, Paper presented at the IEEE Symposium on Security and Privacy, Oakland, CA, pp. 190-200 (May 1996).

Garfinkel, S. and Spafford, G., "Networks and Security" in Practical UNIX Security (CA: O'Reilly & associates, Inc.), pp. 221-253 (1992).

Gong, L., et al., "Going Beyond the Sandbox: An Overview of the new Security Architecture in the Java™ Development Kit 1.2," Paper presented at the USENIX Symposium on Internet Technologies and Systems, Monterey, CA (Dec. 1997).

Kaufman, C., et al., "Authentication Systems" in Network Security, Private Communication in a Public World (NJ: PTR Prentice Hall), pp. 177-203 (177-203 (1995).

Panagiotis, C., "HOSTS.EQUIV(4)," Man-cgi 1.11, (1994). Retrieved from the Internet <URL:http://www.mcsr.olemiss.edu/cgi-bin/man-cgi?rhosts+4>.

"Robots.txt Tutorial," PHD Software Systems, (1996-2002). Retrieved from the Internet <URL:http://www.searchengineworld.com/robots/robots_tutorial.htm>.

Secure Computing with Java™: Now and the Future [online], Aug. 2001 [retrieved on Feb. 12, 2002]. Retrieved from the Internet <URL:http://java.sun.com/marketing/collateral/security.html>.

\* cited by examiner

SYSTEM AND METHOD FOR SPECIFYING ACCESS TO RESOURCES IN A MOBILE CODE SYSTEM

RELATED APPLICATION

This application claims the benefit of U.S. Provisional Application No. 60/328,465, filed Oct. 11, 2001. The entire teachings of the above application are incorporated herein by reference.

BACKGROUND OF THE INVENTION

The growth of the Internet has led to the development of numerous technologies for the distribution of content over the World Wide Web. Among these technologies are systems that permit Web content to include executable code, that is sent from a Web server to a Web client, where it is executed. Such "mobile code" or "applets" allow content providers to distribute content that includes programmed behavior, which may be used in a variety of ways. Mobile code systems, such as Java, produced by Sun Microsystems, of Palo Alto, Calif., or Curl, provided by Curl Corporation, of Cambridge, Mass., may greatly enhance the experience of Web users by providing a relatively efficient way for highly interactive or media-rich content to be sent across the Web.

Although such mobile code systems provide access to highly desirable features, they also raise serious security issues. Including executable code in Web content exposes Web users to a variety of attacks. The same systems that provide an efficient way to distribute highly interactive or engaging content also provide a means to distribute malicious code, such as viruses, programs designed to steal information from user's computers, or other damaging programs. Even if such programs are not intentionally distributed, the use of mobile code opens the possibility that errors in executable Web content may have potentially disastrous results on the computers of Web users who view the content. These security issues are made worse by the fact that the highly interactive Web applications that can be designed using mobile code are particularly attractive to Web users, who may be easily induced to view Web pages containing hostile mobile code.

To address these security issues, mobile code systems such as Java typically impose limits on which system resources may be accessed by applets. An applet will typically have only limited access to the file system on a client computer, the CPU, memory, the network resources available to the computer, and so on. Additionally, the programming languages associated with mobile code systems typically include features which enhance security, such as type safety and garbage collection, to prevent inappropriate use of operations on objects, unsafe access to memory resources, memory leakage, and other potential memory-related problems that may be exploited by malicious code.

Unfortunately, despite these efforts, it is difficult or impossible to create a useful programming language or mobile code system that is completely free of security issues. A clever attacker can exploit minor security holes to effectively completely break the security of a mobile code system, and launch a variety of attacks.

Attempts have been made to reduce the possibility of attacks by limiting the locations on a network that may be accessed by an "unprivileged" (or "untrusted") applet. For example, some mobile code systems permit an unprivileged applet to use a network only to access resources on the server from which the applet was downloaded. While this effectively limits the ability of such untrusted applets to attack computers other than the server that provided the applet and the client computer that downloaded the applet, in can be a severely limiting restriction.

SUMMARY OF THE INVENTION

The severely limiting restriction of permitting an unprivileged applet to only establish a network connection to the server from which the applet was downloaded is overcome by the use of a name file on a content server. The present invention allows an applet to make a connection to any server which will allow it access.

A method of creating a network connection between an applet executing on a client computer and a content server computer determines a home site name for the applet, the home site name corresponding to a host name of a computer from which the applet was downloaded to the client computer. A name file on the content server computer is checked for the presence of a hostname entry having an access construct, the hostname entry corresponding to the home site name for the applet. The applet is permitted to create a network connection with the content server computer if the hostname entry was present. The applet is denied permission to create a network connection with the content server computer if the hostname entry was not present. Execution of applets on the client computer is controlled by an execution engine. Checking for the presence of a hostname entry in the name file of the content server computer comprises using network restriction software in the execution engine to check for the presence of the hostname entry.

"Access constructs in the name file comprise an allow list, the allow list includes the hostname entry representing a computer from which the applet is allowed to have been downloaded from in order to allow the creation of the network connection. The access constructs can also comprise an except list, which includes the hostname entry representing a computer from which the applet is not allowed to have been downloaded from in order to allow the creating of the network connection. The host name entries in either the allow construct or the except construct can be specified using wildcards. A special entry (allow-all) can be included in the name file to allow access to applets downloaded from any host computer."

The hostname entry can be used to determine types of network connections that are permitted between the applet and the content server computer as well as to perform an address check. The address check determines an address list for the content server computer, determines an address list for the computer from which the applet was downloaded and denies permission for the applet to create a network connection with the content server computer if the address list for the content server computer is not a subset of the address list for the computer from which the applet was downloaded. The address check can also deny permission for the applet to create a network connection with the content server computer if the home site name for the applet is in dotted quad form, and an address specified by the dotted quad form is not identical to an address for the content server computer.

BRIEF DESCRIPTION OF THE DRAWINGS

The various features and advantages of the invention will be apparent from the following description of particular embodiments of the invention, as illustrated in the accompanying drawings in which like reference characters refer to the same parts throughout the different views. The drawings are

DETAILED DESCRIPTION OF THE INVENTION

Figure 1:
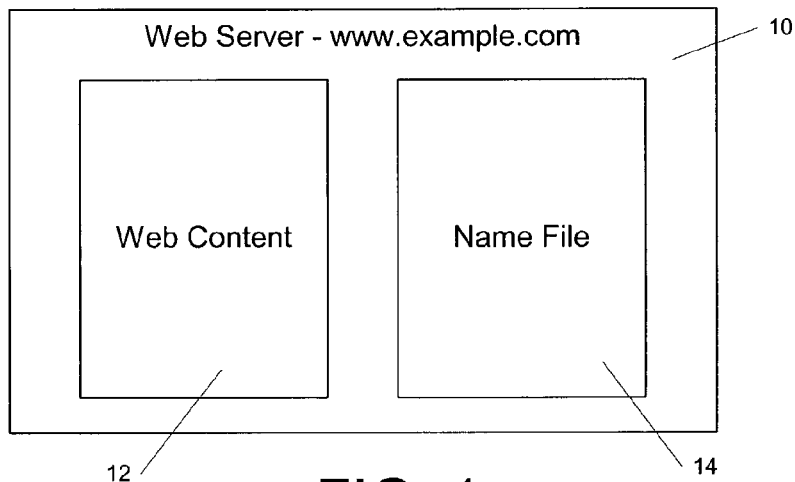
FIG. 1 is a diagram of a content server in accordance.

Referring to FIG. 1, Web server 10, having a host name of "www.example.com", provides access to a variety of Web content 12, such as Web pages and applets. Web server 10 may also provide services that may be accessed by applets or mobile code running on client computers. Access to such services may be granted through use of name file 14, in accordance with the methods and apparatus described in commonly owned, co-pending U.S. patent application Ser. No. 09/818,302, filed on Mar. 27, 2001, and entitled "System and Methods for Securely Permitting Mobile Code to Access Resources Over a Network", which is incorporated herein by reference.

Name file 14 is a file on Web server 10, that can be accessed over a network. Whenever an applet wishes to establish a connection with Web server 10, the execution engine or runtime system in which the applet executes first checks to see if the name of the computer from which the applet was loaded is matched in name file 14 on Web server 10. If so, then the connection can be established. If not, then the applet is not permitted to establish a connection with Web server 10.

Figure 2A:
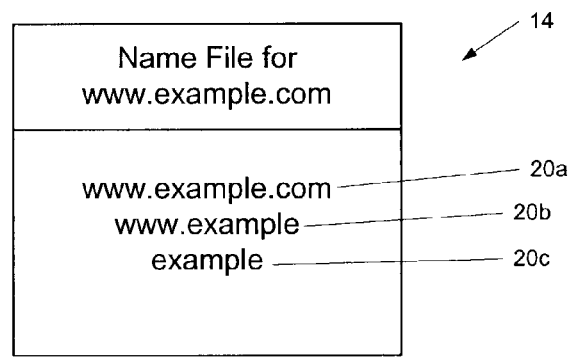
FIGS. 2A-2B are illustrative diagrams of a name file.

Referring now to FIG. 2A, a more detailed view of name file 14 is shown. Name file 14 may contain zero or more entries, each entry indicating a name of an alternative host name for the computer on which the name file is located, or otherwise specifying the host name of a computer whose applets are permitted to create connections with the computer on which the name file is located (hereinafter, the "content server"). Such entries in a name file, such as name file 14, shall be referred to hereinafter as "hostname entries".

In FIG. 2A, name file 14 contains hostname entry 20a, having the name "www.example.com". Thus, applets from www.example.com are permitted to establish connections to www.example.com, because its name file contains hostname entry 20a. In addition to hostname entry 20a, name file 14 also contains hostname files 20b and 20c which represent standard synonyms for "www.example.com", which would typically be used within the "example.com" domain.

Figure 2B:
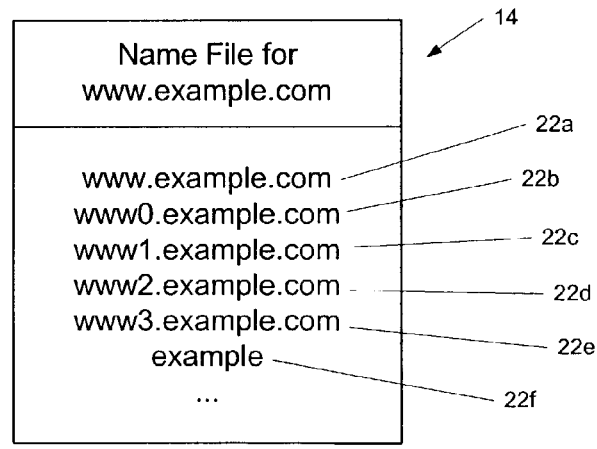

In FIG. 2B, a name file 14 contains hostname entries 22a-22f, each specifying a different host name. It is possible that multiple host names may all refer to the same computer, or that all of the named computers may serve content for the same logical web site. By placing multiple hostname entries in name file 14, applets originating from any of the named computers of hostname entries 22a-22f are permitted to access the computer on which name file 14 is located. Thus, an applet having a home site of "www.example.com" or "www3.example.com" could access the content server on which name file 14 is located, but an applet having a home site of "badname.example.com" could not.

A name file, such as name file 14, should be present on each computer with which an applet should be able to create a network connection. In the case of computers that "mirror" each other to create multiple sources for a logical web site, each such computer should have in its name file an entry for the name of the logical web site. The name files of such "mirror" computers may also have other entries, such as entries for their own host names.

It will be understood by one skilled in the relevant arts that name file 14 could be implemented using a variety of constructs, such as a name directory, or a name database, or by other means of storing such data in a manner that permits it to be accessed over a network. It will further be recognized by one skilled in the arts that the hostname entries contained in name file 14 need not contain only host names. Other information, such as the types of network connections that are permitted with the content server could be specified with the host names in name file 14.

Figure 3:
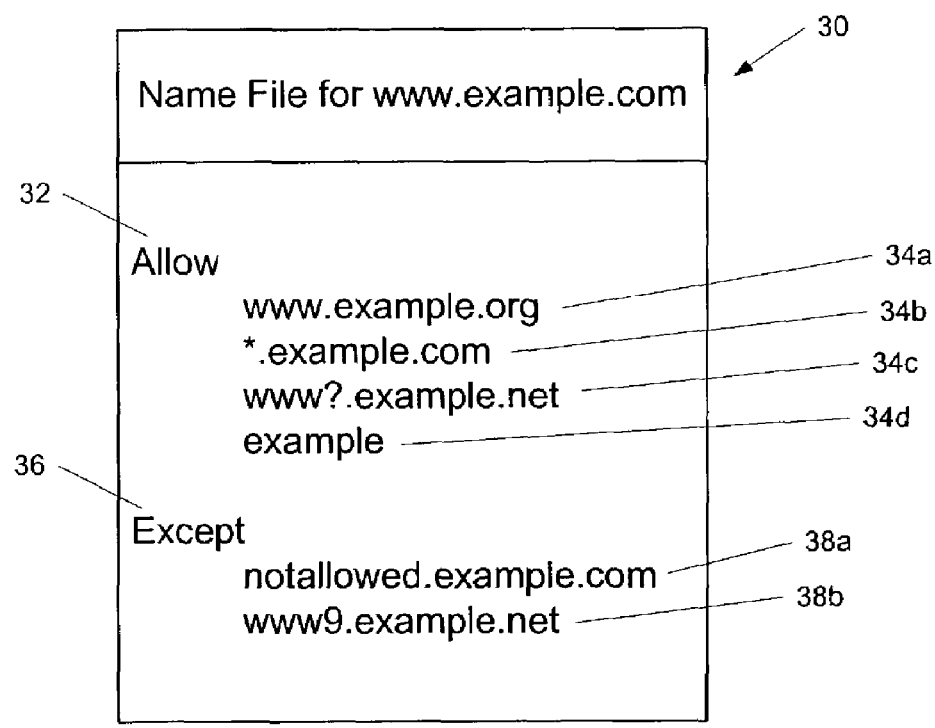
FIG. 3 is a diagram of a name file using Allow and Except constructs in accordance with the principles of the present invention.

Referring now to FIG. 3, name file 30, prepared in accordance with the principles of the present invention, contains Allow construct 32 and Except construct 36. Allow construct 32 is followed by host names of the home sites of applets that are allowed to access the system on which file 30 is present (hereinafter referred to as the "allow list"). The host names following Allow construct 32 may optionally include wildcards, such as is shown in host name 34b, to indicate that applets from numerous host names should be allowed access. The "*" wildcard character can be used to match any string of zero or more characters. For example, host name 34b specifies that applets from "*.example.com" should be allowed to access the content server. This means that applets from any host name, followed by ".example.com", or any other system in the "example.com" domain, should be allowed to access the content server on which name file 30 is present.

The "?" wildcard character may be used to match any single character. Thus, host name 34c, which specifies that applets from "www?.example.net" should be allowed access, would allow access to applets from "www1.example.net", "www2.example.net", "wwwA.example.net", and so on. Host name 34c would not permit access to applets from "test.example.net" or "www29.example.net", since these do not match "www?.example.net".

It will be understood by one skilled in the relevant arts that other wildcard characters may be used in the host names that follow Allow construct 32. In general the host names following Allow construct 32 may comprise any regular expression. It should be noted that in a preferred embodiment, the wildcard characters may not appear in a domain name. Thus, "*.com" and "www.*.com" would not be valid entries in the allow list, since the wildcard character appears in the domain name, rather than in the host name.

Advantageously, permitting use of wildcard characters in the allow list permits rapid specification of numerous home systems for applets that are permitted to access a content server. Use of wildcard characters provides greatly increased flexibility in describing a network of related systems.

Except construct 36 is also followed by a list of host names 38a-38b (hereinafter, the "except list"). The host names following Except construct 36 represent the systems whose applets are not permitted to access the system on which name file 30 is located, despite the possibility that, due to use of wildcard characters, they may match one or more of the names listed in the allow list following Allow construct 32.

Thus, applets from host name 38a ("notallowed.example.com") would not be able to access the content server on which name file 30 is located, even though host name 34b in the allow list specifies that "*.example.com" should be allowed access.

Note that if a name appears on, or is matched on both the allow list and the except list, the entry in the except list takes precedence, and applets from the host named in the except list will not be permitted access to the content server. This policy prevents ambiguity when a host name appears on both the allow list and the except list.

Unlike the host names following Allow construct 32, in a preferred embodiment, wildcard characters may not be used to specify host names following Except construct 36. This further clarifies the policy that the except list takes precedence over the allow list, since each host name on the except list must be fully specified. Advantageously, the ability to use wildcards in an Allow construct, but not in an Except construct provides a high degree of control over access, while being easy to understand and easy to use.

Figure 4:
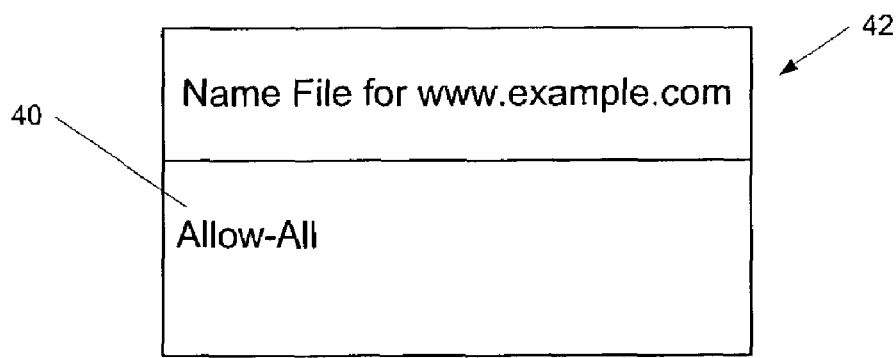
FIG. 4 is a diagram of a name file using an Allow-All construct in accordance with the principles of the present invention.

Referring to FIG. 4, in accordance with the principles of the present invention, Allow-All construct 40 is shown in name file 42. Allow-All construct 40 may be used to allow applets from any applet server to access the content server on which name file 42 is located.

It should be noted that name files as described hereinabove can be used at the "root" level of a web site or other resource that is accessible over a network, or at any other point in a directory structure associated with such a site. If used in a directory, the name file controls access to the resources contained in that directory. Where a name file is used at the root level of the site, it controls access to everything on the site, and overrides any name files found in directories.

Figure 5:
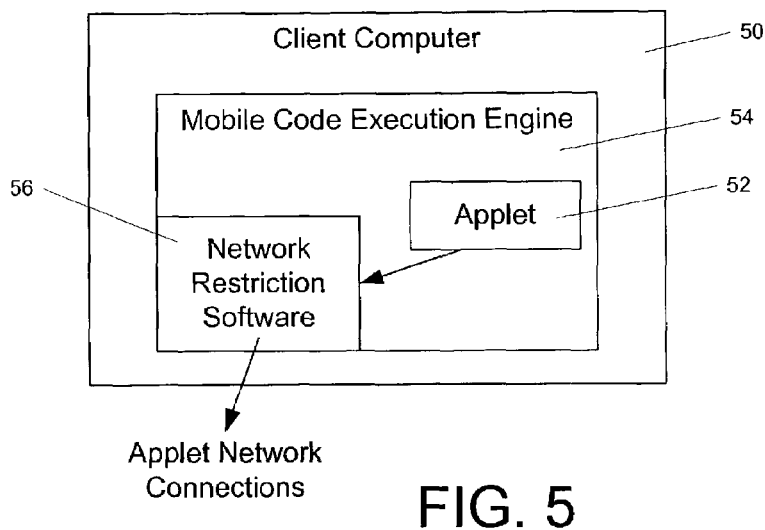
FIG. 5 is a diagram showing use of an execution engine and network restriction software in accordance with a preferred embodiment of the present invention.

Use of Allow, Except, and Allow-All constructs in name files on a content server allows the content server to specify which applet servers will be able to provide applets that may access the content server. Enforcement of the restrictions specified by these constructs is handled on the client computer that executes an applet. Thus, as shown in FIG. 5, client computer 50 runs applet 52 by using an execution engine 54. Running an applet within an execution engine, such as execution engine 54, is typical for mobile code systems, and typically permits applets to be machine independent, so they may be executed on different types of computers or operating systems, as long as any computer on which the applet is to be used is capable of running the execution engine in which the applet is executed.

Use of an execution engine also permits mobile code, such as applet 52, to have its ability to access resources on client computer 50 limited. For example, because applet 52 is executed by execution engine 54, execution engine 54 may restrict applet 52 from accessing files on client computer 50. Similarly execution engine 54 may restrict the ability of applet 52 to establish network connections with other computers.

In accordance with the principles of the present invention, execution engine 54 includes network restriction software 56, which is the only software through which applets executed by execution engine 54 are able to establish network connections with other computers. Network restriction software 56 permits applet 52 to connect with other computers only after first checking that a name file on the computer with which a connection is to be established contains an Allow-All construct, or that the name file contains an Allow construct followed by an entry that matches the name of the home site of applet 52, and that the home site of applet 52 is not on the list of names that follows an Except construct. Only if these conditions are met will network restriction software 56 permit a connection to be established.

It will be understood that the system and the methods of the present invention are complementary to, and may be used in conjunction with the methods described in the U.S. patent application entitled "System and Methods for Securely Permitting Mobile Code to Access Resources Over a Network", which was incorporated by reference hereinabove. In a preferred embodiment, network restriction software 56 restricts access in accordance with the methods described therein, as well as performing the functions described with reference to FIGS. 5 and 6.

Figure 6:
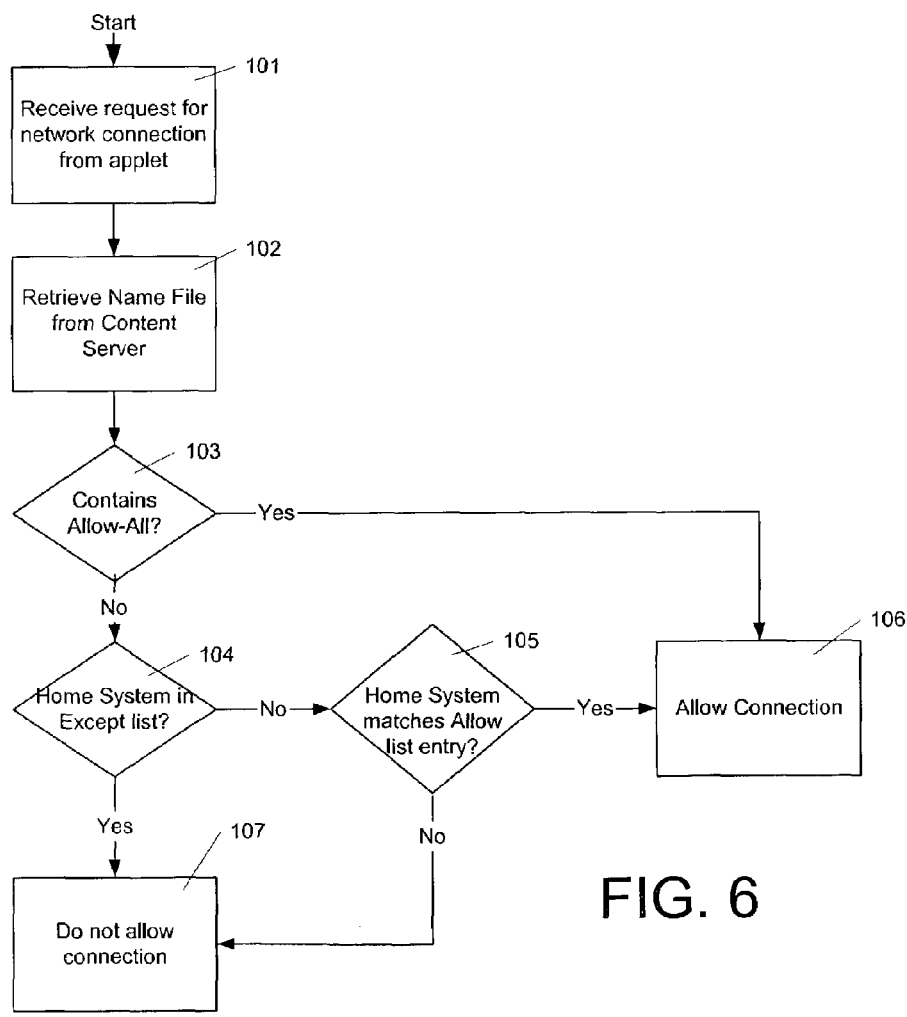
FIG. 6 is a flowchart of a preferred embodiment of the network restriction software of the present invention.

Referring now to FIG. 6, a flowchart showing the operation of a preferred embodiment of network restriction software 56 is described. At step 101, a request to create a network connection is received from an applet. Preferably, all attempts by applets to create connections to other computers over a network are processed through the network restriction software of the execution engine under which the applets execute.

At step 102, the network restriction software retrieves a name file from the content server to which the applet is attempting to connect. Preferably, the file is checked to make certain that it is a valid name file, that it is consistent, and adheres to the necessary syntax rules.

At step 103, the network restriction software checks to see if the name file contains an Allow-All construct. If so, then access is permitted. Otherwise, at step 104, the network restriction software checks to see if the home site name of the applet is in the except list following an Except construct.

If the home system of the applet is not in an except list, at step 105, the network restriction software checks to see of the home site name of the applet matches an entry in the allow list following an allow construct. If so, then access is permitted. Otherwise, if the home site name of the applet does not match an entry in the allow list, or the home site name of the applet is listed in the except list, then access is not permitted.

At step 106, if access is permitted, the network restriction software allows the applet to establish a connection with the content server.

At step 107, if access was not permitted, network restriction software 56 does not allow the applet to create a network connection and access the resource that it requested from the content server. In a preferred embodiment, network restriction software 56 provides the applet with only limited information about the failure to establish a connection. Specifically, the applet is not given information on the reason that access was denied, since such information could be used to for hostile purposes, such as network mapping. Note that a user of the client may be given more information about the reason for a failure (e.g., in an error message on his screen) than should be provided to the applet that attempted to access the resource.

It will be understood by one skilled in the relevant arts that the procedures provided hereinabove may be implemented in a variety of ways. It will further be recognized that various optimizations may be used to reorder or skip the listed steps without changing the semantics of the procedures.

Note that Allow and Except constructs in accordance with the present invention are preferably used on content servers on an intranet to name applet servers on the same intranet. For example, a content server "content.example.com" could permit access to applets from all applet servers on the intranet (by placing "*.example.com" in the allow list), except for applets from "www.example.com" (by placing "www.example.com" in the except list), which is considered less secure than the other applet servers on the intranet. Preferably, the intranet on which the systems and methods of the present invention is used is well configured and secure, since access to content servers is really only as secure as the rest of the network configuration.

Use of Allow and Except constructs may be somewhat less secure if used on an extranet (such as the Internet), since, for example, it is not difficult for an applet server to change its name to avoid the exclude list. Generally, the Allow-All construct should be used on extranets. It will be understood that these limitations for the use of the Allow, Exclude, and Allow-All constructs are merely guidelines, and that these constructs can generally be used with most any network configuration.

In addition to being used to control access to content servers, the system and methods of the present invention may be used to control the ability of applets to access the file system on a client computer. Name files, such as those described with reference to FIGS. 3 and 4 may be placed in directories on a client computer. Before an applet may access files in the directory that contains such a name file, the name file would have to be checked to see if the applets from the applet's home site are permitted to access files in the directory. This check would preferably be performed by file access restriction software in the execution engine that is executing the applet. Such file restriction software would preferably operate in a manner similar to the network restriction software described with reference to FIGS. 5 and 6.

Use of a name file, as described herein, permits a trust decision about a resource to be specified at the resource to be accessed, while the enforcement of that trust decision is handled at the client that is running an applet that attempts to access the resource. Thus, in the case of a content server, the selection of which applets will be able to access the content server is specified on the content server, through the name file on the content server, while the enforcement of that decision is handled by the network restriction software of the execution engine on a client system. Similarly, when name files are used to control access to files systems, the decision about which applets will be permitted access is specified in the directory to be accessed, and the enforcement of that decision is handled by the execution engine.

Since the name file is not present on the same system as the software that enforces the trust decisions in the name file, updating the client software requires special care. In a preferred embodiment, whenever an update is made that adds to the allowance syntax (e.g. Allow or Allow-All), this is regarded as a minor version change in the name file syntax. Clients that encounter a name file that uses allowance syntax of a later version than they are able to handle may simply ignore any such allowance syntax that they do not understand. At worst, the syntax that is being ignored may be intended to permit some applet to access resources, and the client that ignores that syntax will improperly deny such access.

If there is a change in the denial syntax (Except), this is a major version change, and the client should not attempt to use the name file to grant or deny access to resources. This is because if a client misinterprets the denial syntax, an applet could be improperly granted access to resources to which access should have been denied.

To create name files that are compatible with multiple versions of the client, a preferred embodiment of the present invention will place banners in the name file, identifying the version to which the following portion of the name file applies. A single name file can, using such banners, include complete trust instructions for several different versions of the client software that enforces those instructions. If a client encounters a banner that it knows how to handle, it will use the portion of the name file that follows that banner to grant or deny access to resources.

Figure 7:
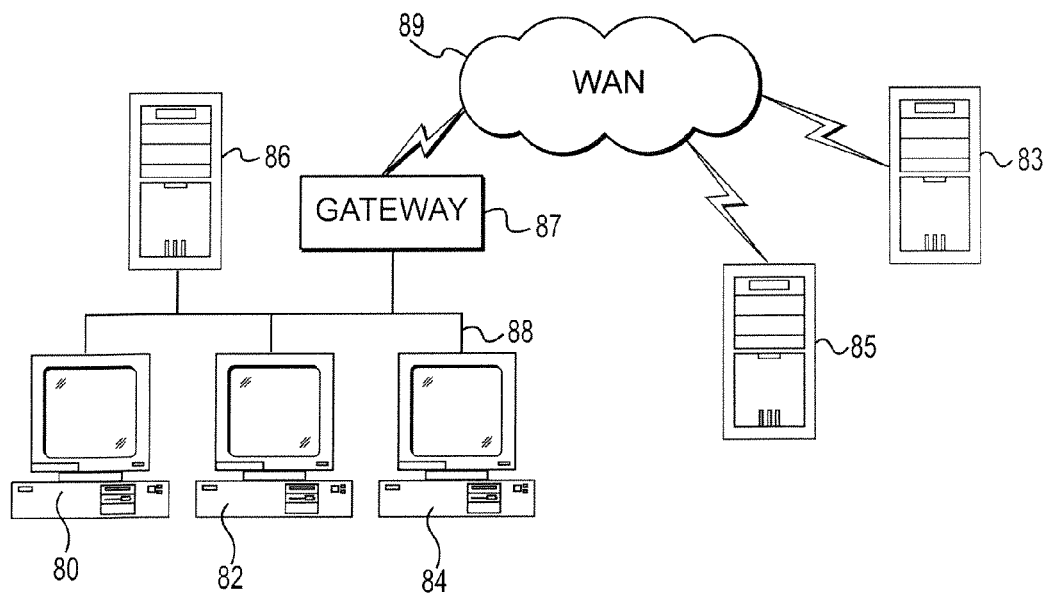
FIG. 7 is a diagram of a network environment suitable for use with the system and methods of the present invention.

Referring now to FIG. 7, an example of a computing environment in which the system and methods of the present invention may be used is described. Computers 80, 82, and 84, and server 86 are connected to one or more local area networks, such as local area network (LAN) 88. Each of computers 80, 82, and 84 may execute a variety of software, all or part of which may be stored locally on computers 80, 82, or 84, or may be stored on server 86, and accessed over LAN 88.

LAN 88 is connected to a wide area network (WAN) 89, such as the Internet, through gateway 87, which may be a dedicated device, or may be a computer or server, similar to computers 80, 82, and 84, or server 86. Additionally, gateway 87 may provide the functions of a firewall, preventing unauthorized network connections from being established with computers on LAN 88 from computers outside of LAN 88.

By sending communications across WAN 89, any of the devices connected to LAN 88 may communicate with remote servers 85 and 83, as well as other computers or devices that can be accessed over WAN 89. Computers 80, 82, and 84 may gain access to information and software through WAN 89, including applets or other mobile code. Such applets may, for example, be stored on remote server 85, and may be accessed by any of computers 80, 82, or 84, which may transfer the applet from remote server 85, so as to execute the applet locally.

Each computer or device accessible through WAN 89 has a name, and a numerical address. Some of the computers or devices which may be accessed through WAN 89 have multiple names which refer to the same numerical address, or may have multiple numerical addresses and multiple names. The names of devices connected to WAN 89 can be translated into corresponding numerical addresses by a set of DNS servers (not shown) connected to WAN 89.

It will be understood by one skilled in the art that the network configuration shown in FIG. 7 is for illustration only, and that most any network configuration may be used with the system and methods of the present invention. Further, it will be understood that many types of devices may be connected to LAN 88, including printers (not shown), storage devices (not shown), and other types of devices that may be connected to a network.

Figure 8:
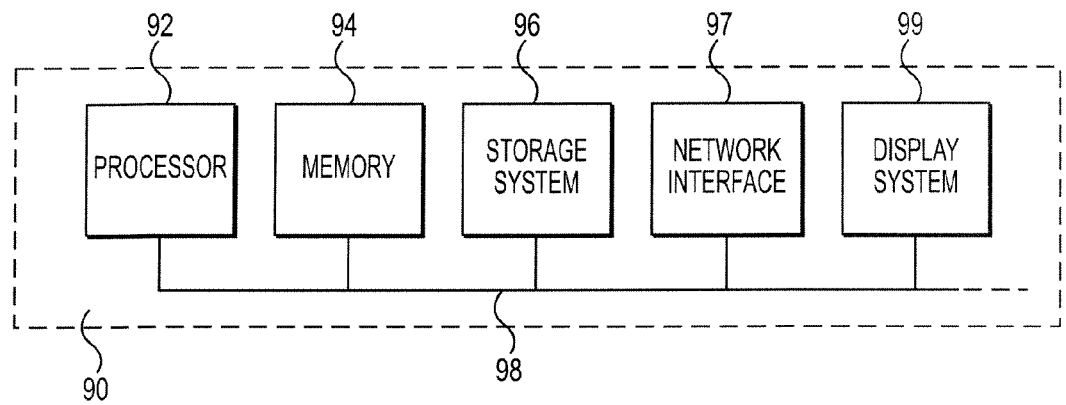
FIG. 8 is a diagram of a computer system suitable for use with the system and methods of the present invention.

Referring now to FIG. 8, a block diagram of a computer system suitable for use with the present invention is described. Computer system 90 includes at least processor 92 for processing information according to programmed instructions, and memory 94, for storing information and instructions for processor 92. Additionally, computer system 90 may optionally include storage system 96, such as a magnetic or optical disk system, for storing instructions and information on a relatively long-term basis. Computer system 90 also may include network interface 97, and display system 99, such as a video controller and monitor, on which information may be displayed. Processor 92, memory 94, storage system 96, network interface 97, and display system 99 are coupled to bus 98, which preferably provides a high-speed means for devices connected to bus 98 to communicate with each other.

It will be apparent to one of ordinary skill in the art that computer system 90 is illustrative, and that alternative systems and architectures may be used with the present invention. It will further be understood that many other devices, such as an audio output device (not shown), and a variety of other input and output devices (not shown), such as keyboards and mice, may be included in computer system 90. Computer system 90 may be a personal computer system, a workstation, a set-top box designed to be connected to a television or other similar display, a hand-held device, such as a cell phone or personal digital assistant, or any other device that contains a processor capable of executing programmed instructions and a memory capable of storing programmed instructions.

Those skilled in the art should readily appreciate that the programs defining the operations and methods defined herein are deliverable to a computer in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable out of a memory by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware and software components.

While preferred illustrative embodiments of the present invention are described above, it will be evident to one skilled in the art that many changes and modifications may be made without departing from the invention.

What is claimed is:

1. A method of creating a network connection between an applet executing on a client computer and a content server computer, the method comprising:

providing a name file on the content server computer, the name file having at least one list specifying a type of access that is permissible between the content server computer and applets;

determining a home site name for the applet, the home site name corresponding to a host name of a computer from which the applet was downloaded to the client computer;

checking the name file for an association of a hostname entry with the at least one list in the name file, the hostname entry corresponding to the home site name for the applet, wherein checking the name file for an association comprises determining the at least one list in which the hostname entry is located and identifying the type of access that the at least one list specifies as permissible between the content server computer and the applet; and making a decision to allow or deny permission for the applet to create a network connection with the content server computer based on the at least one list with which the hostname entry is associated.

2. The method of claim 1, wherein an execution engine executes the applet on the client computer, and wherein checking the name file comprises using network restriction software in the execution engine to check for the association of the hostname entry with the at least one list.

3. The method of claim 1, wherein the at least one list is an allow list, wherein, when the hostname entry is associated with the allow list, making the decision comprises allowing permission for the applet to create the network connection with the content server computer, and wherein, when the hostname is not associated with the allow list, making the decision comprises denying permission for the applet to create the network connection with the content server computer.

4. The method of claim 1, wherein the hostname entries are specified using wildcards.

5. The method of claim 1, wherein the at least one list is an except list, and wherein, when the hostname entry is associated with the except list, making the decision comprises denying permission for the applet to create the network connection with the content server computer.

6. The method of claim 1, wherein the at least one list comprises an allow all entry indicating permission to allow all accesses to the content server computer, and wherein making the decision comprises allowing permission for any applets downloaded from any host computer to create the network connection with the content server computer.

7. The method of claim 1, further comprising using the hostname entry to determine types of network connections that are permitted between the applet and the content server computer.

8. The method of claim 1, further comprising performing an address check by:

determining an address list for the content server computer;

determining an address list for the computer from which the applet was downloaded; and denying permission for the applet to create the network connection with the content server computer when the address list for the content server computer is not a subset of the address list for the computer from which the applet was downloaded.

9. The method of claim 8, wherein performing the address check further comprises denying permission for the applet to create the network connection with the content server computer when the home site name for the applet is in a selected form, and an address specified by the selected form is not identical to an address for the content server computer.

10. A computer-readable storage medium containing instructions for performing a method for creating a network connection between an applet executing on a client computer and a content server computer, the method comprising:

providing a name file on the content server computer, the name file having at least one list specifying a type of access that is permissible between the content server computer and applets;

determining a home site name for the applet, the home site name corresponding to a host name of a computer from which the applet was downloaded to the client computer;

checking the name file for an association of a hostname entry with the at least one list in the name file, the hostname entry corresponding to the home site name for the applet, wherein checking the name file for the association comprises determining the at least one list in which the hostname entry is located and identifying the type of access that the at least one list specifies as permissible between the content server computer and the applet; and making a decision to allow or deny permission for the applet to create the network connection with the content server computer based on the at least one list with which the hostname entry is associated.

11. A computer system for creating a network connection comprising:

a client computer executing an applet;

a content server computer having a name file having at least one list specifying a type of access that is permissible between the content server computer and applets; and a processor:

executing the applet on the client computer and determining a home site name for the applet, the home site name corresponding to a host name of a computer from which the applet was downloaded to the client computer;

checking the name file for an association of a hostname entry with the at least one list in the name file, the hostname entry corresponding to the home site name for the applet, wherein checking the name file for the association comprises determining the at least one list in which the hostname entry is located and identifying the type of access that the at least one list specifies as permissible between the content server computer and the applet; and making a decision to allow or deny permission for the applet to create the network connection with the content server computer based on the at least one list with which the hostname entry is associated.

12. The method of claim 1, further comprising denying permission for the applet to create the network connection with the content server computer when the hostname entry is not associated with any list.

13. The computer system of claim 11, wherein the processor denies permission for the applet to create the network connection with the content server computer when the hostname entry is not associated with any list.

14. The method of claim 1, wherein the at least one list comprises an except list and a second list, and wherein, when the hostname is associated with the except list, making the decision comprises denying permission for the applet to create the network connection with the content server computer.

15. The method of claim 14, wherein the second list comprises an allow list for allowing permission for the applet to create the network connection with the content server computer.

16. The method of claim 1, wherein the at least one list comprises an except list for denying permission for the applet to create the network connection with the content server computer and an allow all entry indicating permission to allow all accesses in the name file, and wherein, when the hostname is associated with the allow all entry, making the decision comprises allowing permission for an applet downloaded from any host computer to create the connection with the content server computer.

17. A method for determining permissions to create a network connection between an applet executing on a client computer and a content server computer having a name file with at least one list specifying a type of access that is permissible between the content server computer and applets, the method comprising:

determining a home site name for the applet, the home site name corresponding to a host name of a computer from which the applet was downloaded to the client computer;

checking the name file for an association of a hostname entry with the at least one list in the name file, the hostname entry corresponding to the home site name for the applet, wherein checking the name file for the association comprises determining the at least one list in which the hostname entry is located and identifying the type of access that the at least one list specifies as permissible between the content server computer and the applet; and making a decision to allow or deny permission for the applet to create the network connection with the content server computer based on the at least one list with which the hostname entry is associated.

18. The method of claim 17, further comprising denying permission for the applet to create the network connection with the content server computer when the hostname entry is not associated with any list.

19. The method of claim 1, wherein the at least one list comprises an except list and a second list; and wherein, when the hostname is associated with the except list and the second list, making the decision comprises denying permission for the applet to create the network connection with the content server computer.

* * * * *

UNITED STATES PATENT AND TRADEMARK OFFICE
CERTIFICATE OF CORRECTION

PATENT NO. : 7,424,550 B2  Page 1 of 1
APPLICATION NO. : 10/269102
DATED : September 9, 2008
INVENTOR(S) : Davis et al.

It is certified that error appears in the above-identified patent and that said Letters Patent is hereby corrected as shown below:

On the Title Pg.

Item [*] Notice: Subject to any disclaimer, the term of this patent is extended or adjusted under 35 USC 154(b) by 594 days Delete the phrase "by 594 days" and insert -- by 708 days --

Signed and Sealed this

Eighth Day of December, 2009

David J. Kappos
*Director of the United States Patent and Trademark Office*